United States Patent
Chakraborty et al.

(10) Patent No.: US 11,880,985 B2
(45) Date of Patent: *Jan. 23, 2024

(54) TRACKING MULTIPLE OBJECTS IN A VIDEO STREAM USING OCCLUSION-AWARE SINGLE-OBJECT TRACKING

(71) Applicant: Microsoft Technology Licensing, LLC, Redmond, WA (US)

(72) Inventors: Ishani Chakraborty, Seattle, WA (US); Yi-Ling Chen, Redmond, WA (US); Lu Yuan, Redmond, WA (US)

(73) Assignee: Microsoft Technology Licensing, LLC., Redmond, WA (US)

( * ) Notice: Subject to any disclaimer, the term of this patent is extended or adjusted under 35 U.S.C. 154(b) by 67 days.

This patent is subject to a terminal disclaimer.

(21) Appl. No.: 17/827,695

(22) Filed: May 28, 2022

(65) Prior Publication Data

US 2022/0292828 A1 Sep. 15, 2022

Related U.S. Application Data

(63) Continuation of application No. 16/886,442, filed on May 28, 2020, now Pat. No. 11,386,662.

(51) Int. Cl.
*G06T 7/246* (2017.01)
*G06V 20/40* (2022.01)
(Continued)

(52) U.S. Cl.
CPC ............ *G06T 7/246* (2017.01); *G06F 18/214* (2023.01); *G06V 10/25* (2022.01); *G06V 10/75* (2022.01);
(Continued)

(58) Field of Classification Search
None
See application file for complete search history.

(56) References Cited

U.S. PATENT DOCUMENTS 11,335,008 B2    5/2022    Chakraborty et al.
11,386,662 B2 *  7/2022    Chakraborty .......... G06V 20/53
(Continued)

FOREIGN PATENT DOCUMENTS

WO    2021101527 A1    5/2021

OTHER PUBLICATIONS

"Non Final Office Action Issued in U.S. Appl. No. 17/585,053", dated May 3, 2023, 22 Pages.
(Continued)

*Primary Examiner* — Leon Flores
(74) *Attorney, Agent, or Firm* — Barta, Jones & Foley, PLLC

(57) ABSTRACT

The disclosure herein enables tracking of multiple objects in a real-time video stream. For each individual frame received from the video stream, a frame type of the frame is determined. Based on the individual frame being an object detection frame type, a set of object proposals is detected in the individual frame, associations between the set of object proposals and a set of object tracks are assigned, and statuses of the set of object tracks are updated based on the assigned associations. Based on the individual frame being an object tracking frame type, single-object tracking is performed on the frame based on each object track of the set of object tracks and the set of object tracks is updated based on the performed single-object tracking. For each frame received, a real-time object location data stream is provided based on the set of object tracks.

20 Claims, 6 Drawing Sheets

(51) Int. Cl.
  *G06F 18/214* (2023.01)
  *G06V 10/25* (2022.01)
  *G06V 10/75* (2022.01)
  *G06V 20/52* (2022.01)

(52) U.S. Cl.
  CPC .............. *G06V 20/41* (2022.01); *G06V 20/46* (2022.01); *G06V 20/53* (2022.01)

(56) References Cited

U.S. PATENT DOCUMENTS

| | | |
|---|---|---|
| 11,645,834 B2 | 5/2023 | Han et al. |
| 2014/0347475 A1 | 11/2014 | Divakaran et al. |
| 2017/0236013 A1 | 8/2017 | Clayton et al. |
| 2018/0253629 A1 | 9/2018 | Bamba |
| 2019/0286938 A1 | 9/2019 | Backhus et al. |
| 2019/0370606 A1 | 12/2019 | Kehl et al. |
| 2021/0390335 A1 | 12/2021 | Du et al. |
| 2022/0148197 A1 | 5/2022 | Chakraborty et al. |

OTHER PUBLICATIONS

"Notice of Allowance Issued in U.S. Appl. No. 17/585,053", dated Aug. 22, 2023, 11 Pages.

\* cited by examiner

TRACKING MULTIPLE OBJECTS IN A VIDEO STREAM USING OCCLUSION-AWARE SINGLE-OBJECT TRACKING

CROSS-REFERENCE TO RELATED APPLICATION

This application is a continuation application of and claims priority to U.S. patent application Ser. No. 16/886,442, entitled "TRACKING MULTIPLE OBJECTS IN A VIDEO STREAM USING OCCLUSION-AWARE SINGLE-OBJECT TRACKING," filed on May 28, 2020, the disclosure of which is incorporated herein by reference in its entirety.

BACKGROUND

Understanding object movements in video streams is one of the fundamental problems of computer vision technology development. The task of Multi-Object Tracking is to detect the objects of interest and track them across different frames while maintaining the correct identities of the objects. Understanding spatial-temporal dynamics of humans is of interest as it enables downstream tasks such as activity and/or intent recognition. Online, real-time tracking focuses on inferring tracks of motion and/or trajectory based on the current frame and past frames of a person or other object. Tracking the movement of people or other objects in video streams with multiple objects presents substantial challenges, including partial or total occlusion of tracked objects by other objects in the scene and significant resource and time requirements associated with consistently and accurately detecting objects within each frame of a video stream.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for tracking multiple objects in a real-time video stream is described. For each individual frame received from the video stream, a frame type of the frame is determined. Based on the individual frame being an object detection frame type, a set of object proposals is detected in the individual frame, associations between the set of object proposals and a set of object tracks are assigned, and statuses of the set of object tracks are updated based on the assigned associations. Based on the individual frame being an object tracking frame type, single-object tracking is performed on the frame based on each object track of the set of object tracks and the set of object tracks is updated based on the performed single-object tracking. For each frame received, a real-time object location data stream is provided based on the set of object tracks.

BRIEF DESCRIPTION OF THE DRAWINGS

The present description will be better understood from the following detailed description read in light of the accompanying drawings, wherein:

Corresponding reference characters indicate corresponding parts throughout the drawings. In FIGS. 1 to 6, the systems are illustrated as schematic drawings. The drawings may not be to scale.

DETAILED DESCRIPTION

Figure 1:
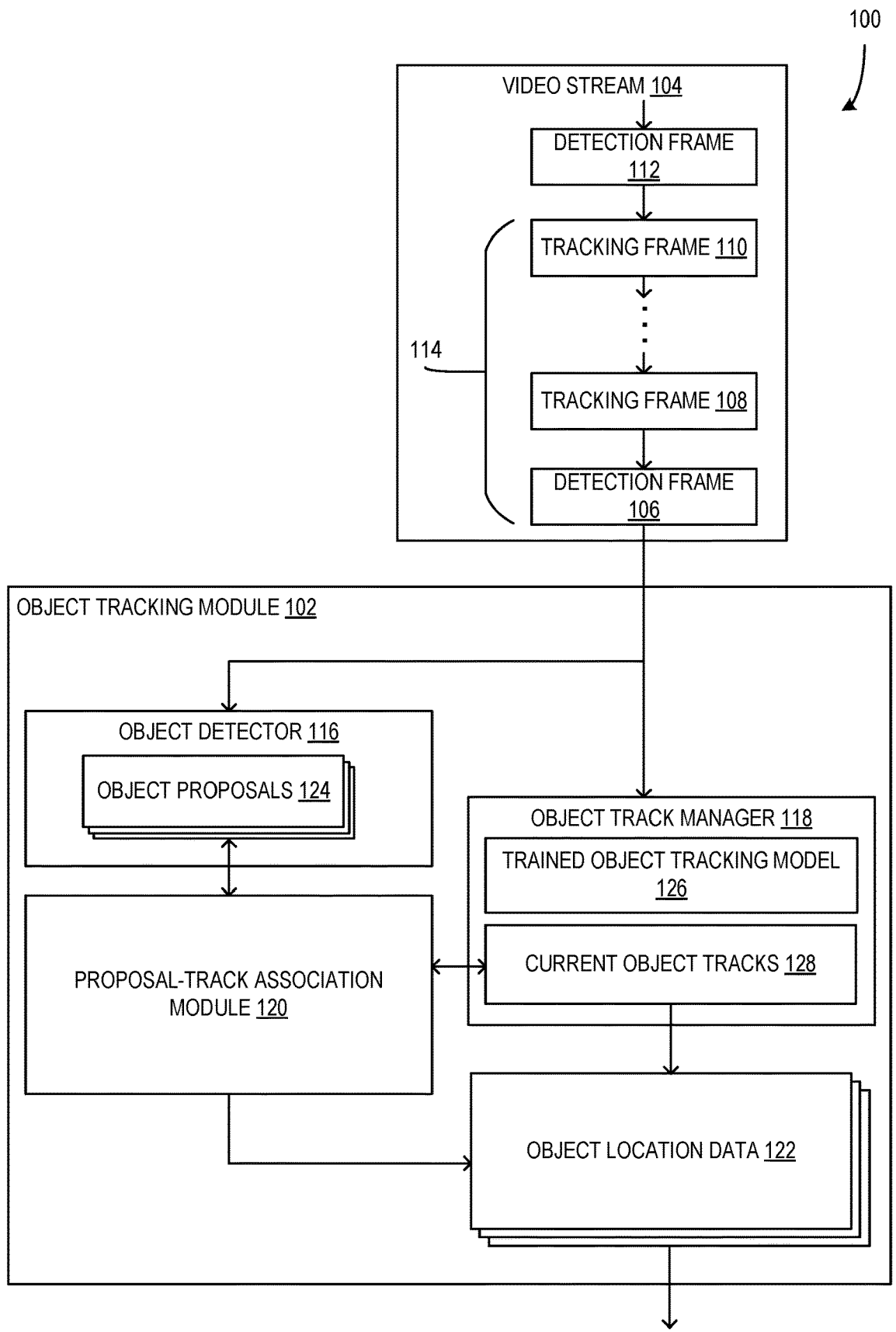
FIG. 1 is a block diagram illustrating a system for tracking multiple objects in a video stream and providing associated object location data in real-time according to an embodiment.

Understanding object movements in video streams is one of the fundamental problems of computer vision technology development. The task of Multi-Object Tracking is to detect the objects of interest and track them across different frames while maintaining the correct identities of the objects. Understanding spatial-temporal dynamics of humans is of interest as it enables downstream tasks such as activity and/or intent recognition. Online, real-time tracking focuses on inferring tracks of motion and/or trajectory based on the current frame and past frames of a person or other object. Tracking the movement of people or other objects in video streams with multiple objects presents substantial challenges, including partial or total occlusion of tracked objects by other objects in the scene and significant resource and time requirements associated with consistently and accurately detecting objects within each frame of a video stream.

The object tracking process may be further complicated by the inclusion of depth information in video streams, as captured by a depth camera, RGB-Depth (RGBD) camera, or the like, requiring an accurate object tracking process to determine movement of objects toward or away from the camera in the third dimension in addition to tracking the movement of the object across the scene of the video frame, which may be useful in applications such as navigation and collision avoidance by robots, virtual environment construction and animation, or gesture and proximity detection.

Recent developments in the field include object detection-based systems, such as Detect-to-Track and Tracktor, which are designed to optimize per-frame accuracy using bounding box regression and/or correlation-based track regression, but these systems ignore temporal consistency considerations, tend to lose track of objects within a few frames, and are unable to recover identities of objects lost due to temporary occlusions, which are the primary cause of tracking errors in crowded scenes. Additional examples include Dual Matching Attention Networks (DMAN), which combines per-frame object detection with object tracking and uses a spatio-temporal attention mechanism for tracking objects, leading to high latency and a large memory footprint that makes it unusable in real-time applications, and Detect or Track, which uses a neural network-based scheduler on every frame to determine whether to detect or track based on the quality of the current tracks present in the frame, but the quality analysis becomes prohibitively costly when applied to crowded scenarios with many objects to track.

The disclosure describes systems and methods that use a two-stage process of periodic object detection in a frame of a video stream and single-object tracking in intervening frames. The object detection process and object tracking process are linked by an association assignment process that enables the systems and methods to take advantage of both types of analyses to track multiple objects as described. The object detection, while computationally more expensive than object tracking, is performed only periodically to identify new objects in the scene and to match with and/or calibrate the current object tracking instances. The object tracking processes are used on the frames between object detections to propagate the location data of the objects in the scene along trajectories and to enable re-identification of objects in the scene that may have been lost on a previous object detection due to occlusion.

The described systems and methods enable tracking multiple objects in a real-time video stream as described. For each individual frame received from the video stream, a frame type of the frame is determined. Based on the individual frame being an object detection frame type, a set of object proposals is detected in the individual frame, associations between the set of object proposals and a set of object tracks are assigned, and statuses of the set of object tracks are updated based on the assigned associations. Based on the individual frame being an object tracking frame type, single-object tracking is performed on the frame based on each object track of the set of object tracks and the set of object tracks is updated based on the performed single-object tracking. For each frame received, a real-time object location data stream is provided based on the set of object tracks.

The proposed system is configured for real-time and low-latency multi-object or multi-person tracking, which uses, in some examples, a convolutional neural network (e.g., Faster-RCNN) for object detection and correlation filter tracking (e.g., CFNet) for single-object tracking. Other systems perform object detection on a per-frame basis, which is sub-optimal for object tracking because an object detector localizes regions in each image frame independently, which could potentially lead to missed and spurious detections due to occlusions and target interactions in crowded environments. Such object detection-based systems fail to explicitly leverage the temporal aspects of the video stream. For instance, some object detection-based systems use a separate re-identification (ReID) network that is trained to link object detections across multiple frames, but these ReID networks also do not take the temporal context of the video stream into account, which can result in tracking mistakes, such as linking tracks that are far away from each other, or incorrectly identifying people when multiple people wear similar clothing in close proximity. The described systems and methods herein operate in an unconventional manner by introducing a novel tracking loss process between instances of object detection that leverages the temporal context of the video stream and improves the performance of the tracker for tracking one or more people or objects in occluded and/or multi-person or multi-object settings. The system prioritizes matches between object proposals and active object tracks within a two-state matching or association approach. By using single-object tracking between instances of object detection, the resources required to perform consistent object detection in real-time are reduced and the performance of the system is enhanced, enabling real-time, accurate object tracking at low latency and a low memory footprint while tracking tens of people or objects with high accuracy. For instance, performing single-object tracking using a correlation filter, as described herein with respect to some examples, is competitive with more complicated approaches for single-object tracking, uses a fraction of the computational power, and can be performed in real-time at hundreds of frames-per-second. The use of the described association assignment process to link the object proposals identified during object detection and object tracks maintained during the intervening single-object tracking processes enhances the system's ability to recover from 'losing' objects due to temporary occlusion of all or part of an object in the video stream. Additionally, the accuracy of the correlation filter tracking model at tracking objects in crowded scenes is improved by training it with multi-object video stream data, and time and effort costs associated with training the correlation filter tracking model are reduced by training the model based entirely on a large synthetic data set, eliminating the efforts required to annotate real video streams with labels that enable its use for training.

FIG. 1 is a block diagram illustrating a system 100 for tracking multiple objects in a video stream 104 and providing associated object location data 122 in real-time according to an embodiment. The system 100 includes an object tracking module 102 that receives the video stream 104 in real-time in the form of a stream of frames (e.g., frames 106, 108, 110, and 112). The object tracking module 102 includes hardware, firmware, and/or software configured to analyze the frames as they are received and provide object location data 122 associated with multiple objects that are pictured in the frames in real-time or near real-time. In some examples, the object tracking module 102 is implemented on or otherwise associated with computer system that includes one or more computer devices. The video stream 104 may be received by the object tracking module 102 via a communication interface of a computing device, such as an interface between a data storage component and a processing component of a computer device and/or a network interface between a video capture device and a processing component of a computer device. Further, the object location data 122 may be provided to another module, component, or entity via the same or a different communication interface, such as providing the object location data 122 for display on a user interface of a computer device and/or providing the object location data 122 for storage on a data storage component of a computer device. The system 100 may be configured with more, fewer, or different components in other arrangements without departing from the description herein.

The video stream 104 includes a plurality of frames (e.g., frames 106-112) that are provided to the object tracking module 102 in consecutive order at a defined rate. The object tracking module 102 is configured to classify each received frame as a defined frame type. As illustrated, frames may be of a detection frame type (e.g., detection frames 106 and 112) or a tracking frame type (e.g., tracking frames 108 and 110). The type of a frame is used by the object tracking module 102 to determine how to analyze the frame for object tracking as described herein. The classification of frame type for the frames of the video stream 104 are based on a defined frame interval 114, which may include a quantity of frames (e.g., an interval of 30 frames) and/or a time interval (e.g., an interval of one second). A set of frames in an interval includes a detection frame (e.g., detection frame 106) as the first frame of the interval and tracking frames (e.g., tracking frames 108-110) as the remaining frames in the interval. In some examples, each frame of the set of frames is processed as described herein, one at a time, as they are received by the object tracking module 102. As a result, the object detection process and associated analysis is performed once per interval with respect to the first frame of the interval and the object tracking process and associated analysis is performed with respect to each tracking frame of the interval (e.g., if the interval is 30 frames, the object detection process is performed once and followed by the object tracking process being performed for each of the 29 following frames). After all the frames of an interval have been received by the object tracking module 102, the next frame received is classified as the first frame of a new interval (e.g., detection frame 112). In other examples, different intervals and/or patterns of detection frames and tracking frames may be used without departing from the description herein.

The object tracking module 102 includes an object detector 116, and object track manager 118, and a proposal-track association module 120. The combined processes of these modules produce object location data 122 that may be provided to another module and/or interface from the object tracking module 102. If a frame that is currently being processed is a detection frame, it is provided to the object detector 116 and the object detection process is performed. Alternatively, if the frame that is currently being processed is a tracking frame, it is provided to the object track manager 118 and the object tracking process is performed. The object detection process further engages the proposal-track association module 120.

In some examples, the object detector 116 is configured to analyze a received detection frame to generate one or more object proposals 124. In some examples, the object proposals 124 are generated based on the application of an object detection algorithm and/or process to the current detection frame (e.g., the objects detected are based on independent analysis of each detection frame with no use of adjacent frames for the object detection process). The object detector 116 may be trained using machine learning processes or techniques to detect objects in the frame and, further, the training of the object detector 116 may include training associated with specific types of objects (e.g., people, cars, animals, or the like). The training data used may include large ensembles of data sets which capture diverse camera viewpoints, visibility, or occlusion sizes. In some examples, the object detector 116 includes one or more convolutional neural networks (CNNs) and/or region-based CNNs (R-CNNs) trained to detect the locations of specific types of objects (such as people) in a frame and provide the associated location data in the form of object proposals 124 that include bounding boxes. However, in other examples, other types of object detection processes or algorithms may be used without departing from the description herein.

The object tracking manager 118 includes a trained object tracking model 126 and is configured to create and manage the current object tracks 128 associated with the video stream 104. Received tracking frames (e.g., tracking frames 108-110) are provided to the object tracking manager 118 and are used by the manager 118 to update the current object tracks 128 based on the new information provided in the tracking frames. In some examples, the object tracking manager 118 is configured to perform single-object tracking processes and/or algorithms to propagate and link object detections made by the object detector 116 over time between detection frames. In such examples, the trained object tracking model 126 is trained to perform single-object tracking for each current object track 128 and to update each current object track 128 based on the results of the associated single-object tracking performance. Single-object tracking is used to maintain and update state information of each tracked object as it moves in space from frame to frame and to use the state information to link temporarily occluded objects back to their original states after disocclusion.

In some examples, the object track manager 118 is configured to use a correlation filter tracker (e.g., based on the CFNet algorithm) that uses the trained object tracking model 126 to discriminate between images and their translations. It takes advantage of the fact that the convolution of two patches (i.e., their dot-product at different relative translations) is equivalent to an element-wise product in the Fourier domain. Thus, by formulating the tracking objective in the Fourier domain, it can specify the desired output of a linear classifier for several translations, or image shifts, at once.

The objective function of the correlation filter tracker can be expressed as the following Ridge Regression in the image space:

$$J(w) = \mathrm{Argmin}_w \frac{1}{2n} w \star \phi(x) - g^2 + \frac{\lambda}{2} w^2$$

In the above equation, w represents the learned template, $\phi(x)$ is a feature map of the image to the searched, and g is the target (ideal response) shape to which the model regresses (e.g., a 2 dimensional (2D) Gaussian). A 2D Gaussian represents a distribution with its peak at the image center. The ★ operator indicates the circular cross correlation between the transformed input and the template.

The objective is solved in the equivalent Lagrangian dual to make it computationally efficient. According to the Representer theorem, w is replaced by a linear combination of the basis samples. Accordingly, based on the kernel trick, the algorithm may be written in terms of dot-products which could be computed using a kernel function:

$$w = \sum_n \alpha_k \phi(x_k), \; K(x, x') = \phi^T(x)\phi^T(x')$$

The kernel matrix K represents all pairwise dot products between feature maps of images and templates. Thus, the solution to solve this problem is as follows:

$$\alpha = (K + \lambda I)^{-1} y \;\; f(z) = w^T z = \sum_n \alpha_k K(z, x_k)$$

The correlation filter tracker (CFNet) formulates the tracking problem as the ability to discriminate between images and their translations. Mathematically, image translations can be represented by cyclic shifts, i.e., by permuting the image sample with a circulant permutation matrix. A property of circulant matrices is that they are made diagonal by the Discrete Fourier Transform. Therefore, the above optimization is mapped to the Fourier domain to achieve two computational advantages. First, the cross-correlations in the image space become element-wise multiplications in the Fourier space. Second, the circulant kernel matrix is a diagonal matrix in the Fourier domain, making it easier to compute the inverse, and thereby the problem becomes differentiable from end to end. The above solution can be expressed as the following two-step solution in the Fourier domain:

Initialize Object State:

$$\phi(z) = Conv_2(w_2 * Conv_1(w_1 * z))$$

$$\alpha^0 = \frac{Y^F}{K^F(\phi(z), \phi(z))}$$

Detect Response:

$$f(x) = \text{if } ft(\sum_n \alpha^t K^F(\phi(x), \phi(z)),$$

$$c_x, c_y, s = \text{argmax}(f(xx))$$

Update Model:

$$\alpha^t = \frac{Y^F}{K^F(\phi(f(z_{c_x,c_y,s})), \phi(f(z_{c_x,c_y,s})))}$$

$$\alpha^t = \delta\alpha^t + (1-\delta)\alpha^{t-1}$$

In other examples, other single object tracking processes and/or algorithms may be used by the object tracking manager 118 without departing from the description herein.

The current object tracks 128 include object location data for each object detected in the frames as determined using the trained object tracking model 126 and object location data of the current object tracks 128 associated with one or more previous frames. Thus, the object track manager 118 performs the object tracking process based on the current tracking frame and based on object location data of the current object tracks 128 from previous tracking frames. In some examples, the current object tracks 128 include, for instance, object location data in the form of bounding boxes of objects and/or coordinates associated with objects, such as coordinates corresponding to the center of the object. In some examples, the current object tracks 128 include subsets of object tracks in different states, such as active states and/or passive states, a described in greater detail below with respect to FIG. 2.

The proposal-track association module 120 is configured to assign associations between the object proposals 124 created by the object detector 116 from a detection frame and the current object tracks 128 of the object track manager 118. The assigned associations link specific object proposals 124 to specific object tracks 128. The operations of the proposal-track association module 120 may further cause new object tracks to be initiated at the object track manager and/or to terminate or otherwise remove object tracks for which the associated object is no longer visible or otherwise detectable in the video stream 104. The operations of the proposal-track association module 120 are described in greater detail below with respect to FIG. 2.

The object location data 122 may be generated and provided based on the current object tracks 128 and/or the assigned associations of the proposal-track association module 120. In some examples, the object location data 122 includes object identifiers or labels, bounding boxes, and/or coordinates of detected and/or tracked objects in associated frames of the video stream 104. Alternatively, or additionally, the object location data 122 may include trajectories $\{T^1, \ldots T^N\}$, with each trajectory corresponding to an object, such as a person, moving within the continuous video stream 104. Each trajectory $T^i$ links a sequence of detected object states $\{s_t \ldots s_{t+k}\}$, where t marks the first visible frame for the object and t+k marks the last visible frame within the viewpoint of the camera in the video stream 104. The state of an object p is given by $s=(P, S, K, M, C, \delta, O)$. The object state is characterized in three substates: the current location, the tracker template, and the occlusion. P and S define location variables, where P denotes the center of the detected bounding box around the object and S denotes its size. K, C, and M hold the tracked state per object, where K defines the object template, C denotes the confidence score, and M denotes the motion metadata. $\delta$ and O denote the state of occlusion of the object. O denotes whether the object is currently occluded and $\delta$ denotes the persistence of the associated object track under occlusion. Such object location data 122 may be provided for storage, display, or another purpose to another component, device, or other entity as output of the object tracking module 102. For instance, bounding boxes of the object location data 122 may be overlaid on a display of the video stream 104 via a user interface, such that observers can see the trajectories of objects in the video stream 104 in real-time. Additionally, the object trajectory information may be used for object counting within a space, tracking numbers of entries and exits by objects in a space, tracking time spent by objects within a space (dwell time), tracking time spent by objects in a queue (e.g., people lining up in a queue and/or cars moving in a traffic jam). Further, the described trajectory information may be of use in other events that benefit maintaining temporal information of objects in a space without departing from the description herein.

Figure 2:
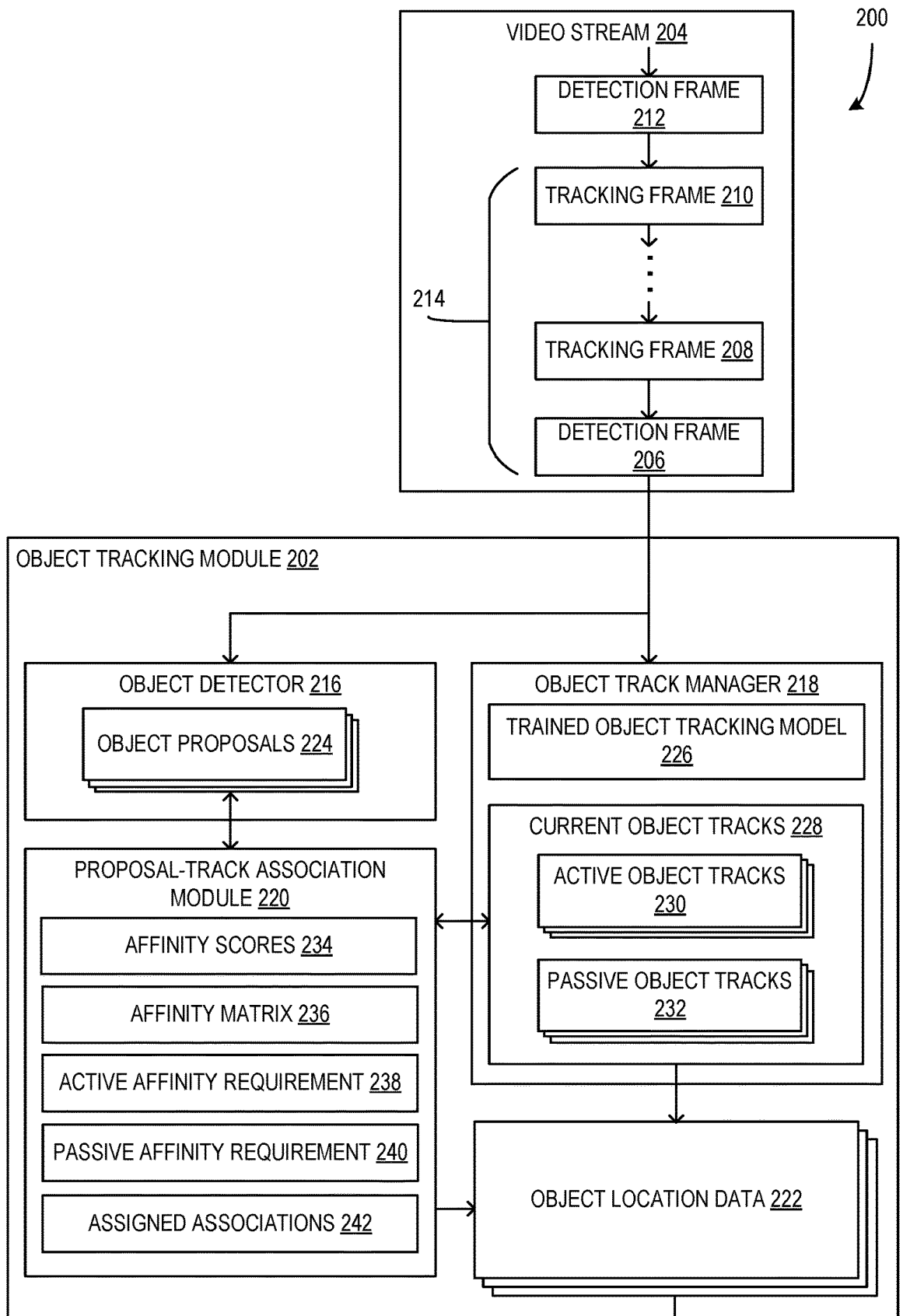
FIG. 2 is a block diagram illustrating a system for tracking multiple objects in a video stream using active object tracks and passive object tracks and affinity-based associations with object proposals according to an embodiment.

FIG. 2 is a block diagram illustrating a system 200 for tracking multiple objects in a video stream 204 using active object tracks 230 and passive object tracks 232 and affinity-based associations 242 with object proposals 224 according to an embodiment. In some examples, the system 200 is configured to operate in substantially the same manner as the system 100 of FIG. 1 described above to provide object location data 222. Additionally, as illustrated, system 200 provides additional detail regarding the assignment of associations by the proposal-track association module 220 and the associated details regarding the current object tracks 228 and the trained object tracking model 226.

Upon receiving a detection frame (e.g., detection frame 206) from the video stream 204 based on the interval 214, the object tracking module 202 provides the frame to the object detector 216, which generates object proposals 224 as described above. The object proposals 224 are used by the proposal-track association module 220 with the current object tracks 228 to assign associations between the object proposals 224 and the current object tracks 228. The assigned associations enable the object tracking module 202 to accurately identify objects in frames of the video stream using the object detector 216 and then track the movement of and handle occlusion of those objects using the current object tracks 228. Thus, for each object detected by the object detector 216, the object track manager 218 maintains an object track 228 that stores the state of the object and extrapolates the trajectory of the object via single-object tracking between instances of object detection by the object detector 216.

In some examples, as part of the association assignment process, the proposal-track association module 220 is configured to calculate affinity scores 234 of each proposal-track pair (e.g., a combination of an object proposal 224 and a current object track 228), construct and/or populate an affinity matrix 236 with the calculated affinity scores, evaluate the calculated affinity scores 234 in the affinity matrix 236 based on an active affinity requirement 238 and/or passive affinity requirement 240, and then, based on those evaluations, assign associations 242 between proposal-track pairs. As a result of the association assignment process, the proposal-track association module 220 is further configured to cause object tracks to be in an active state (e.g., active object tracks 230), cause object tracks to be in a passive state (e.g., passive object tracks 232), cause the object track manager 218 to create new active object tracks 230, and/or cause the object track manager 218 to remove passive object tracks 232 from the current object tracks 228.

Calculating the affinity scores 234 for a proposal-track pair includes calculating one or more types of affinities (e.g., spatial affinity and/or appearance affinity) between the object location data of the object proposal 224 and the object location data of the object track 228. In some examples, the proposal-track association module 220 is configured to calculate a spatial affinity between a proposal and a track, calculate an appearance affinity between the proposal and the track, and then combine the two affinities into a single weighted affinity score associated with that proposal-track pair. For instance, in an example, the spatial affinity between a proposal and a track is quantified between bounding boxes using the intersection over union (IoU) metric as well as the Euclidean distance between the centers of the bounding boxes. This may be combined into one equation for the spatial affinity as follows:

$$\text{Affinity}_{spatial} = \frac{1}{Z} e^{\frac{D_f^N(o_t, o_d) + (1 - IoU(o_t, o_d))}{2}}$$

In the above equation, Z is used to normalize the value between 0 and 1. An IoU of zero (i.e., when the boxes do not overlap) adds a constant penalty of one to the spatial distance between points. As the boxes overlap, the IoU dominates and reduces the cost of matching the boxes.

In an example, appearance-based affinity is determined by applying the correlation filter associated with the object track manager 218 to the object proposal and directly use the maximum score in the confidence map as the appearance affinity. An equation for appearance affinity is as follows:

$$\text{Affinity}_{appearance} = \max(iff(\sum_n \alpha^t K^F(\phi(z_{cache}), \phi(x_{detection}))))$$

The calculated spatial affinity and appearance affinity scores may be combined into a single weighted score. For instance, each affinity score may be multiplied by a weight of 0.5 and added together to form a combined affinity score with equal weight given to each affinity type. In other examples, other weights and/or combination methods may be used without departing from the description.

In some example, the affinity matrix 236 is constructed, such that each proposal-track pair is represented by a location in the matrix 236 and the affinity score 234 associated with the pair is populated into that location. The populated affinity matrix 236 may then be solved based on the affinity score values to determine how to assign associations between the proposals 224 and tracks 228. For instance, in an example, the affinity matrix 236 is solved using a bipartite linear assignment algorithm subject to the constraints as follows:

$$\text{maxAffinity} = \max \sum_{ij} M_{ij} x_{ij}; \forall i \sum_j x_{ij} \leq 1; Aj, \sum_i x_{ij} \leq 1; x_{ij} \in \{0, 1\}$$

Where the affinity matrix 236 of each pair of detected object proposal i and each object track j is represented by $\Sigma_{ij} M_{ij} x_{ij}$. In some examples, the Kuhn-Munkres a.k.a. the Hungarian algorithm is used to solve the assignment problem of the affinity matrix 236. It poses the assignment problem as a primal-dual solution, which is implemented by iterative row reduction and column reductions steps. Alternatively, the Jonker-Volgenant algorithm, an approximation of the Kuhn-Munkres, may be used, which uses a Dijkstra-like algorithm for shortest path row augmentation to approximate the Hungarian algorithm. A total time complexity of $O(n^3)$ enables this method to provide rapid assignments.

Further, the assignment of associations 242 may be based on an active affinity requirement 238 and/or a passive affinity requirement 240. Using both requirements 238 and 240, the proposal-track association module 220 is configured to assign associations 242 in a two-state process. First, associations with the active object tracks 230 are made based on the active affinity requirement 238 being met based on associated affinity scores 234. Then, with the subset of object proposals 224 that are not assigned an association with the active object tracks 230, associations with the passive object tracks 232 are made based on the passive affinity requirement 240 being met based on associated affinity scores 234. The active affinity requirement 238 may be configured to be stricter or limiting than the passive affinity requirement 240 (e.g., satisfying the active affinity requirement 238 is rarer and/or more difficult than satisfying the passive affinity requirement 240).

In some examples, the active affinity requirement 238 and passive affinity requirement 240 are defined as combined affinity score 234 thresholds, such that, in order for an association 242 to be assigned to a proposal-track pair with an active object track, the affinity score 234 associated therewith must meet or exceed the active affinity requirement threshold. A lower or otherwise different threshold may be set of the passive affinity requirement 240. Alternatively, or additionally, the requirements 238 and 240 may be based on affinity type. For instance, in an example, the active affinity requirement 238 includes a specific spatial affinity threshold that must be met by an associated spatial affinity score for an association 242 to an active object track 230 to be assigned. Similarly, the passive affinity requirement 240 may include a specific appearance affinity threshold that must be met by an associated appearance affinity score for an association 242 to a passive object track 230 to be assigned. In other examples, more, fewer, or different active affinity requirements and/or passive affinity requirements may be used in assigning association 242 without departing from the description herein.

After the associations 242 are assigned to proposal-track pairs as described, the states of current object tracks 228 may be changed based on how the associations 242 are assigned. If a proposal 224 is assigned an association 242 with an active object track 230, the active object track 230 is considered to be accurately tracking an object that is present in the video stream frames and, as a result, the active object track 230 remains in an active state.

If a proposal 224 is assigned an association 242 with a passive object track 232, the passive object track 232 is considered to be associated with an object that is detectably visible after having been undetectable in the past (e.g., due to partial or complete occlusion in previous frames). As a result, the passive object track 232 is changed to an active state, such that it becomes an active object track 230 for the purposes of the next association assignment process.

If an active object track 230 is not assigned an association from the set of object proposals 224, the active object track 230 is considered to be associated with an object that is either temporarily occluded or that has permanently left the video stream 204. As a result, the active object track 230 is changed to a passive state, such that it becomes a passive object track 232 for the purposes of the next association assignment process.

If a passive object track 232 is not assigned an association from the set of object proposals 224, the passive object track 232 is considered to be associated with an object that remains either temporarily occluded or that has permanently left the video stream 204. In some examples, passive object tracks 232 include object lifetime counters that are set to an initial value when the object track becomes a passive object track 232. If a passive object track 232 is not assigned an association, its object lifetime counter is decremented and, when the counter reaches zero, the passive object track 232 is terminated and/or removed from the current object tracks 228 of the object track manager 218. Alternatively, or additionally, a timestamp indicating when each passive object track 232 became passive may be used to determine whether a passive object track 232 should be removed based on a defined period. During the processing of each detection frame, after associations are assigned, passive object tracks 232 with timestamps that indicate they have exceeded the defined period are terminated and/or removed.

If an object proposal 224 is not assigned an association 242 with any active object tracks 230 or passive object tracks 232, the object proposal 224 is considered to be associated with a new object in the video stream 204. As a result, a new active object track 230 is created in the current object tracks 228 based on the object location data of the unassociated object proposal 224. In some examples, the new active object track is created based on the unassigned object proposal exceeding a defined threshold. The new active object 230 is then used by the object track manager 218 to track the trajectory of the associated object based on tracking frames between object detection processes triggered by detection frames as described herein.

Additionally, in some examples, object track state caching is used to account for missed detection of objects by the object detector 216 and/or occlusion of objects in the video stream 204 (e.g., objects being blocked by other objects in some frames). For instance, if an object track is an active object track 230, its current state is used when calculating an associated affinity score 234 as described. Alternatively, if the object track enters a passive state, such that it becomes a passive object track 232, its state is cached at that moment, though the passive object track 232 continues to be updated during single-object tracking by the object track manager 218 based on tracking frames. When the proposal-track association module 220 calculates affinity scores 234, it is configured to calculate affinity scores 234 associated with each of the current state of the passive object track 232 and the cached state of the passive object track 232 (from when it previously entered the passive state). The highest of the two affinity scores 234 is then used when assigning associations 242. As a result, if the object was explicitly occluded by another object during a detection, the track may be likely to be assigned an association based on the cached state or, if the object was implicitly occluded due to a missed detection on a previous detection, the track may be likely to be assigned an association based on the current state. In such an example, the affinity of a passive object track o with a detected object proposal d may be expressed according to an equation as follows, such that the maximum between the affinity score calculated with respect to the current state of the object track and the affinity score calculated with respect to the cached state of the object track:

$$\text{Affinity}_{app}(d, o_{passive}) = \max(\text{Affinity}_{app}(d, o_{current}), \text{Affinity}_{app}(d, o_{cached}))$$

In other examples, the associations between object proposals and object tracks may be assigned according to other methods of affinity score calculation and/or other affinity requirements without departing from the description herein.

Figure 3:
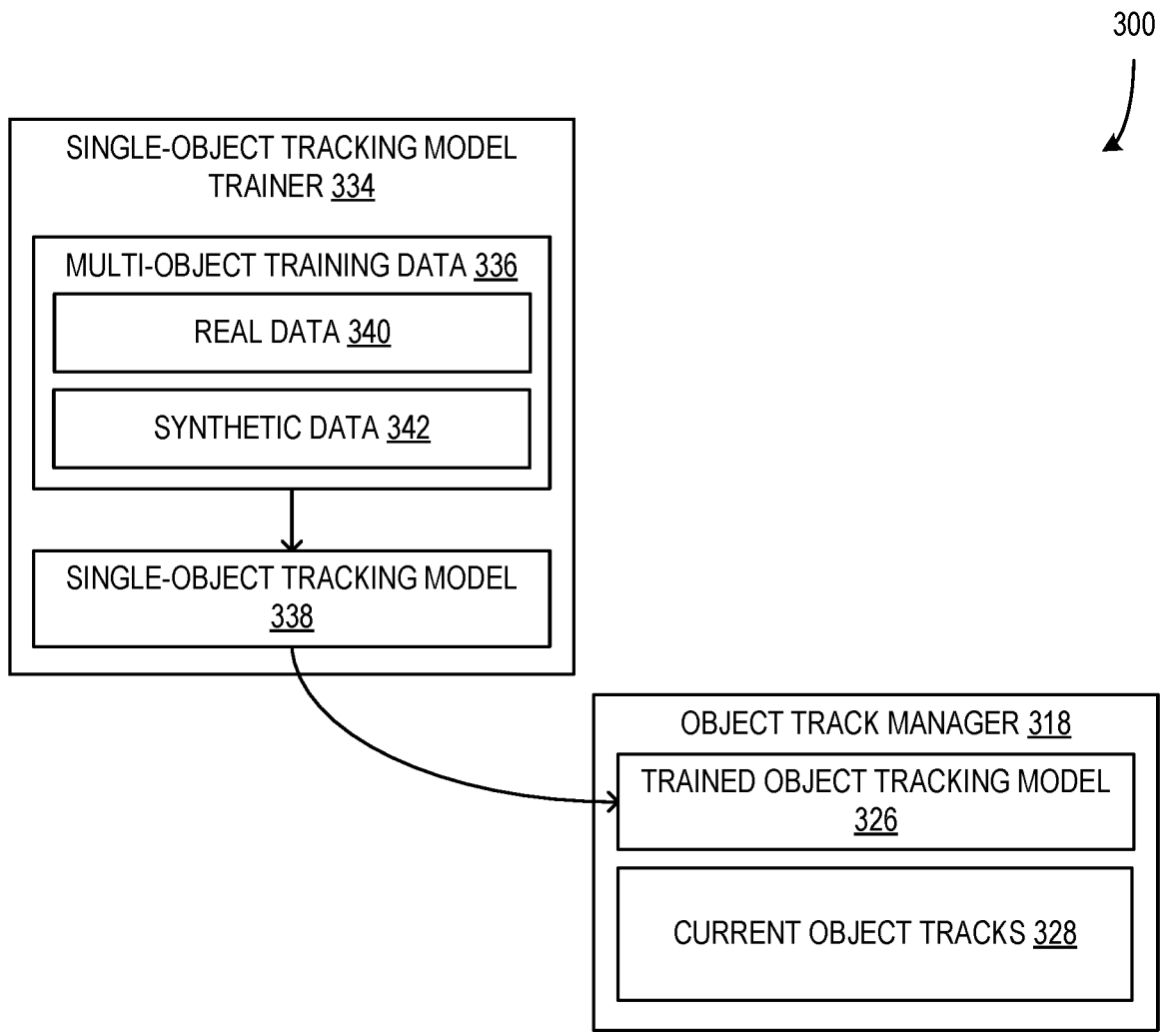
FIG. 3 is a block diagram illustrating a system for training a single-object tracking model for use in tracking objects in a video stream and updating object tracks according to an embodiment.

FIG. 3 is a block diagram illustrating a system 300 for training a single-object tracking model 338 for use in tracking objects (as the trained object tracking model 326) in a video stream and updating object tracks 328 according to an embodiment. In some examples, the system 300 is part of or otherwise associated with a system such as systems 100 and/or 200 of FIGS. 1 and 2, respectively. Further, the training of the single-object tracking model 338 may be performed prior to its use as the trained object tracking model 326 in the object tracking manager 318.

The single-object tracking model trainer 334 includes hardware, firmware, and/or software configured to use training data (e.g., the multi-object training data 336) to train a single-object tracking model 338 which can then be used to perform single-object tracking operations on a series of images (e.g., frames 206-212 of the video stream 204). In some examples, the single-object tracking model trainer 334 is configured to perform single-object tracking on a first portion of the multi-object training data 336 using the single-object tracking model 338 to produce a tracking result and then compare the tracking result to a second portion of the multi-object training data 336 to that comes directly after the first portion. Based on differences between the tracking result and the second portion of training data, the single-object tracking model trainer 334 is configured to adjust rules, attributes, or other aspects of the single-object tracking model 338 in such a way that the accuracy of the single-object tracking model 338 with respect to producing tracking results based on the training data 336 is improved. In other examples, other methods of training the single-object tracking model 338 using the training data 336 may be used without departing from the description.

In some examples, the multi-object training data 336 includes real data 340 and/or synthetic data 342 for use in training the single-object tracking model 338. The real data 340 may include a video stream of an area that has several objects, such as people, moving through it. For instance, real data 340 may include a video stream of multiple customers in shopping in a store. Further, the real data 340 may include a large quantity of video streams of multiple objects in various locations, settings, and/or situations, such that the real data 340 includes a wide variety of possible movement patterns of the objects in order to robustly train the single-object tracking model. In some examples, the real data 340 includes video streams that have been annotated to identify locations of objects in the video streams and those annotations may be used by the model trainer 334 during the training of the single-object tracking model 338.

The synthetic data 342 may include video streams of multiple objects moving through environments that have been generated synthetically by computer or the like. Similar to the real data 340, the synthetic data may include a large quantity of virtual video streams of multiple objects in various locations, settings, and/or situations. Additionally, the synthetic data 342 may be generated to include annotations indicating locations of the objects in the video streams that can be used by the model trainer 334 during the training of the single-object tracking model 338. In some examples, the single-object tracking model trainer 334 trains the single-object tracking model 338 using only synthetic data 342, enabling significant costs of generating and preparing training data from real video streams to be avoided.

In some examples, the single-object tracking model 338 is a correlation filter tracker such as a CFNet model. The trainer 334 is configured to pass a pair of time-shifted patches (e.g., portions of video stream frames) of the same object into a Siamese CNN which generates the features of the target patch on one side of the Siamese CNN and the features of the search patch on the other side of the Siamese CNN. The features of the target patch are passed into the correlation filter tracker model to compute a discriminative template. The template is correlated with the features of the search patch to generate a Gaussian distribution, which is matched to the ideal Gaussian response to compute the loss between performance of the correlation filter tracker in computing the template vs the ideal tracking performance. In further examples, this training routine does not expose the correlation filter tracker model to the temporal evolution of patches as they undergo various pose and/or interaction patterns. Instead, the tracking bias is induced during the model training. The target template is initialized using ground truths and then loss between the template and the ideal performance is computed sequentially on each frame as the model is updated throughout the video sequence. As a result, the training routine is performed in substantially the same manner as the tracking routine described above with respect to the correlation filter tracker. The total loss may then be computed using the ground truths and summed over the sequence of frames of the video stream.

After the single-object tracking model 338 is trained by the single-object tracking model trainer 334, it should be understood that the single-object tracking model 338 is provided to the object track manager 318 as the trained object tracking model 326, such that it can be used during object tracking operations by an object tracking module (e.g., modules 102, 202) with which the object track manager 318 is associated as described herein.

Figure 4:
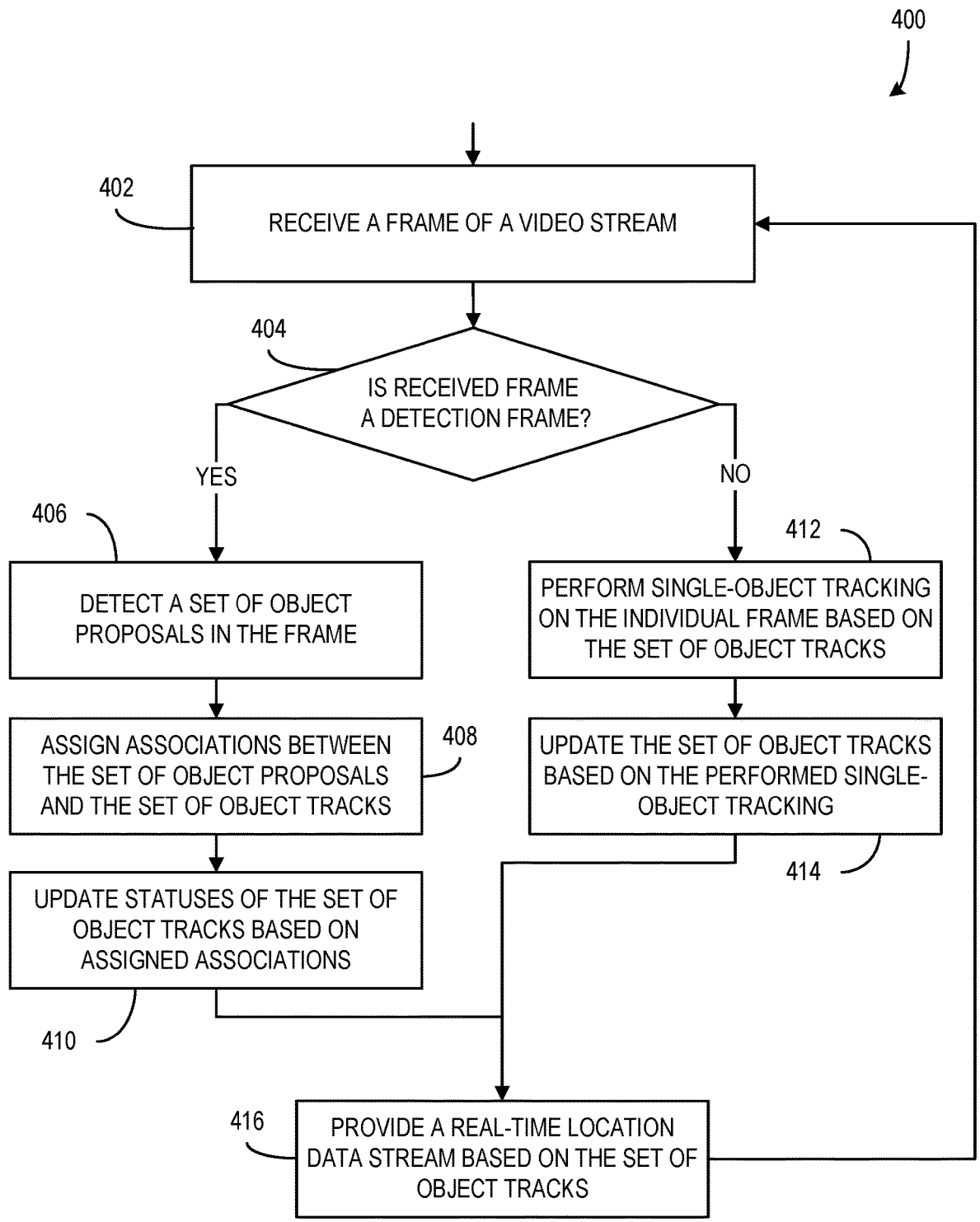
FIG. 4 is a flowchart illustrating a process of tracking multiple objects in a video stream and providing associated object location data according to an embodiment.

FIG. 4 is a flowchart illustrating a process 400 of tracking multiple objects in a video stream and providing associated object location data according to an embodiment. In some examples, the process 400 is executed or otherwise performed by one or more components of a system such as system 100 of FIG. 1 and/or system 200 of FIG. 2. At 402, a frame of a video stream is received. The process 400 may include receiving the frames of a video stream in a continuous sequence at the rate at which the frames were captured and/or recorded (e.g., in real-time). In some examples, the video stream may have been captured in the past and stored and/or it may currently be being captured as the frames are received by the associated object tracking module.

At 404, if the received frame is a detection frame, the process proceeds to 406. Alternatively, if the received frame is not a detection frame (e.g., the frame is at tracking frame), the process proceeds to 412. In some examples, determining whether a received frame is a detection frame is based on a defined frame interval, as described above with respect to interval 114. For instance, the first frame received in a defined time interval may be considered a detection frame while other frames in the time interval are tracking frames. Alternatively, or additionally, the first frame received in a defined quantity of sequential frames may be considered to be a detection frame while other frames in the quantity of sequential frames are tracking frames. In other examples, other intervals and/or patterns may be used when determining whether a received frame is a detection frame without departing from the description.

At 406, a set of object proposals are detected in the received frame. In some examples, the object proposals are detected using an object detection method that analyzes patterns in the frame to identify regions in the frame that may be associated with objects. Further, the object detection process may be based on an object detector component or module that is trained to detect a particular type of object, such as people, cars, animals, or the like. The detected object proposals may include object location data such as bounding boxes, coordinates, object identifiers, or the like.

At 408, associations between the set of object proposals and the set of object tracks are assigned. The associations may be assigned based on determined affinities between individual object proposals and individual object tracks. The, at 410, the statuses of the set of object tracks are updated based on the assigned associations. The association process and status update process are described in greater detail below with respect to FIG. 5.

After the statuses are updated, the process proceeds to 416, at which point, a real-time stream of location data based on the object tracks is provided for display, storage, or other use by another component of the system.

If the frame is not a detection frame at 404, single-object tracking is performed on the individual frame based on the set of object tracks a 412. In some examples, the single-object tracking process is performed to track movement of objects in the frame associated with each object track of the set of object tracks based on the currently received frame and object location data of the object tracks associated with previously analyzed frames. Additionally, or alternatively, the single-object tracking is based on a single-object tracking model trained to track objects using multi-object training data. Further, the training data of the single-object tracking model may be a large set of synthetically generated video streams portraying groups of objects moving and/or interacting in a variety of environments.

At 414, the set of object tracks are updated based on the performed single-object tracking. In some examples, updating the set of object tracks includes adjusting the object location data stored thereon (e.g., bounding boxes, coordinates, etc.) to reflect the results of the performed single-object tracking for each of the object tracks. After the set of object tracks is updated, at 416, the real-time location data stream based on the set of recently updated object tracks is provided as described herein.

After 416, the process may return to 402 to receive another video frame. The process 400 may be performed repeatedly as sequential frames of the video stream are received, such that the object location data stream is provided in substantially real-time after the processing of each frame as described.

Figure 5:
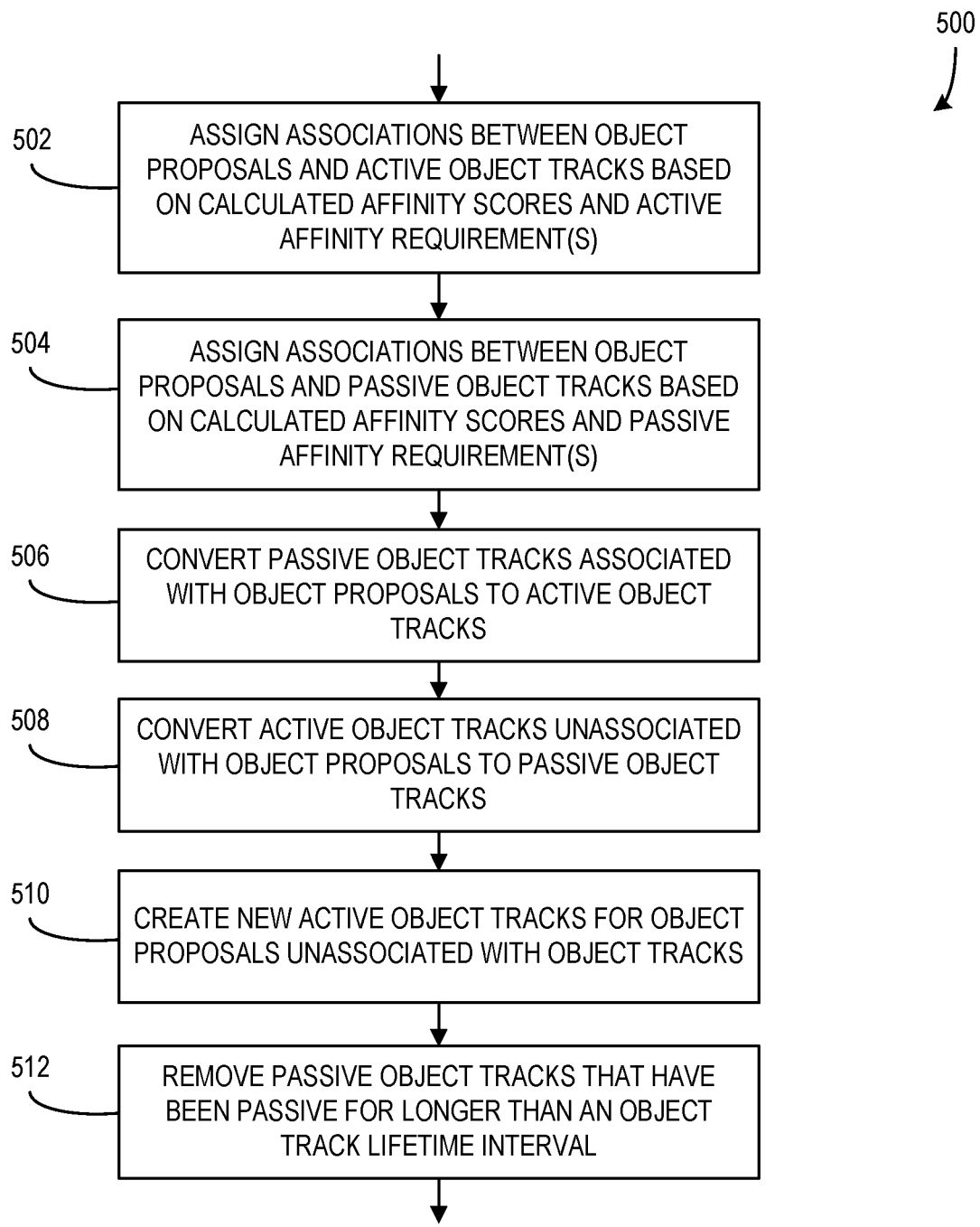
FIG. 5 is a flowchart illustrating a process of assigning associations between object proposals and object tracks according to an embodiment.

FIG. 5 is a flowchart illustrating a process 500 of assigning associations between object proposals and object tracks according to an embodiment. In some examples, the process 400 is executed or otherwise performed by one or more components of a system such as system 100 of FIG. 1 and/or system 200 of FIG. 2. Further, the process 500 may be performed as part of steps 408 and/or 410 of process 400 of FIG. 4. For instance, 502 and 504 may be performed as part of 408 of process 400. At 502, associations between object proposals and active object tracks are assigned based on calculated affinity scores and active affinity requirements. In some examples, the affinity scores are calculated for each pair of an object proposal and an object track and those affinity scores are evaluated using the active affinity requirements to determine which object proposals are assigned associations with the active object tracks. Additionally, or alternatively, the calculated affinity scores may include scores associated with different types of affinities, such as spatial affinity and/or appearance affinity. Further, the active affinity requirements may include thresholds or limits associated with the affinity scores that must be satisfied in order for an association to be assigned between an object proposal and an active object track (e.g., a spatial affinity threshold must be met or exceeded to satisfy the active affinity requirements).

Similarly, at 504, associations between object proposals and passive object tracks are assigned based on calculated affinity scores and passive affinity requirements. In some examples, object proposals that were assigned associations with active object tracks at 502 are not evaluated for the assignment of associations to passive object tracks at 504. Further, as with the active object tracks, the assigning of associations between object proposals and the passive object tracks may be based on evaluating affinity scores based on the passive affinity requirements (e.g., an appearance affinity threshold must be met or exceeded to satisfy the passive affinity requirements). Additionally, or alternatively, the active affinity requirements may be configured to be stricter than the passive affinity requirements, such that it is easier for a pair of an object proposal and a passive object track to be assigned an association than it is for a pair of an object proposal and an active object track to be assigned an association.

In some examples, 506-512 are performed as part of 410 of process 400 as described herein. At 506, after the associations between object proposals and object tracks have been assigned, any passive object tracks that have been assigned an association with object proposals are converted to active object tracks. As a result, during future association assignment processes, active affinity requirements must be satisfied for an object proposal to be assigned an association with this converted object track.

At 508, any active object tracks that are unassociated with object proposals (e.g., no association was assigned to a proposal-track pair that includes the active object track) are converted to passive object tracks. In some examples, converting from an active object track to a passive object track includes storing a timestamp and/or setting an object track lifetime counter based on the conversion. The length of time and/or number of association assignment processes during which a passive object track remains passive is tracked to determine when the passive object track should be removed as described herein. Further, the state of the object track may be cached when it is converted, such that the cached state may be used in future association assignments as described herein.

At 510, for each object proposal that is unassociated with an object track (e.g., no association was assigned to a proposal-track pair that included the object proposal), a new active object track is created in the set of object tracks being maintained by the system. As a result, the newly created object track is maintained throughout the processing of tracking frames and may be assigned associations with object proposals during future association assignment processes.

At 512, the passive object tracks that have been passive for longer than a defined object track lifetime interval are terminated or otherwise removed from the set of object tracks that is maintained by the system. The interval may be associated with a length of time during which the passive object track remains passive (e.g., based on a timestamp that is created when the passive object track becomes passive) and/or with a number of detection frames for which the passive object track remains passive (e.g., based on a counter that is initiated when the passive object track becomes passive).

After 512, the statuses of the object tracks have been updated and the process 500 of the FIG. 5 ends. However, after 512, in some examples, the process 500 proceeds to the next step of an overarching process of processing frames of a video stream, such as process 400. For instance, after 512, the process may proceed to 416 of the process 400 as described above.

Additional Example Scenarios

Aspects of the disclosure enable various additional scenarios, such as next described.

In an example, an object tracking module is configured to track trajectories of multiple people in a video stream from a camera in a convenience store. The video stream is received in real-time by the object tracking module at 15 frames per second and a defined detection frame interval is one detection frame every 15 frames, or one detection frame every second. All other frames are processed as tracking frames as described herein.

The object tracking module provides an object location data stream associated with the video stream in the form of bounding boxes surrounding the tracked people as they move around within the frames of the video streams. The object location data stream further includes identifiers, or labels, such that each tracked person in the video stream is distinguished from the other people in the frame and the labels are maintained consistently as the tracked people move around in the frames of the video stream. The bounding boxes and labels are overlaid on the video stream, such that a viewer of the video stream with the overlay may observe the changes in the bounding boxes and associated location data as people move around in the frames of the video stream.

In a further example, the object tracking module includes four active object tracks associated with four people in the frames of the video stream. When a set of tracking frames of the video stream is received by the object tracking module, the object tracking module performs single-object tracking operations for each of the active object tracks based on a single-object tracking model trained to track people. As a result, object location data of the active object tracks are updated, and the updated object location data is provided for display in the overlay of the video stream.

Upon receiving a detection frame, based on the defined detection frame interval, the object tracking module performs an object detection operation on the frame based on being trained to specifically detect people in video frames. The object tracking module detects four people in the frame and affinity scores associated with each pair of a detected person and an object track are calculated, including a spatial affinity score, an appearance affinity score, and a combined weighted score of both affinity scores. All four of the current object tracks are active and associations are assigned between three of the detected people and three of the active object tracks. The fourth object track that does not have an assigned association is converted to a passive object track, including generating an object track lifetime counter set to a value of two and caching the object location state of the converted passive object track. Based on the detected person that is not assigned an association, the object tracking module creates a new active object track associated with the detected person for tracking during tracking frames.

Later, during another detection frame, after detection of people in the frame, affinity scores associated with the passive object track are calculated for both the current state of the object track and the cached state of the object track. The affinity scores that are highest (e.g., most likely to cause an association to be assigned to the passive object track) are used during the association assignment process. As a result, a detected person is assigned an association to the passive object track and, based on the assigned association, the passive object track is converted back into an active object track.

In a related example, during the processing of the detection frame, another passive object track is not assigned an association with a detected person. Based on the lack of association, the object track lifetime counter is decremented. The object track lifetime counter of the passive object track reaches zero and the passive object track is removed from the set of object tracks, such that the object tracking module does not perform single-object tracking with respect to the removed object track anymore.

Exemplary Operating Environment

Figure 6:
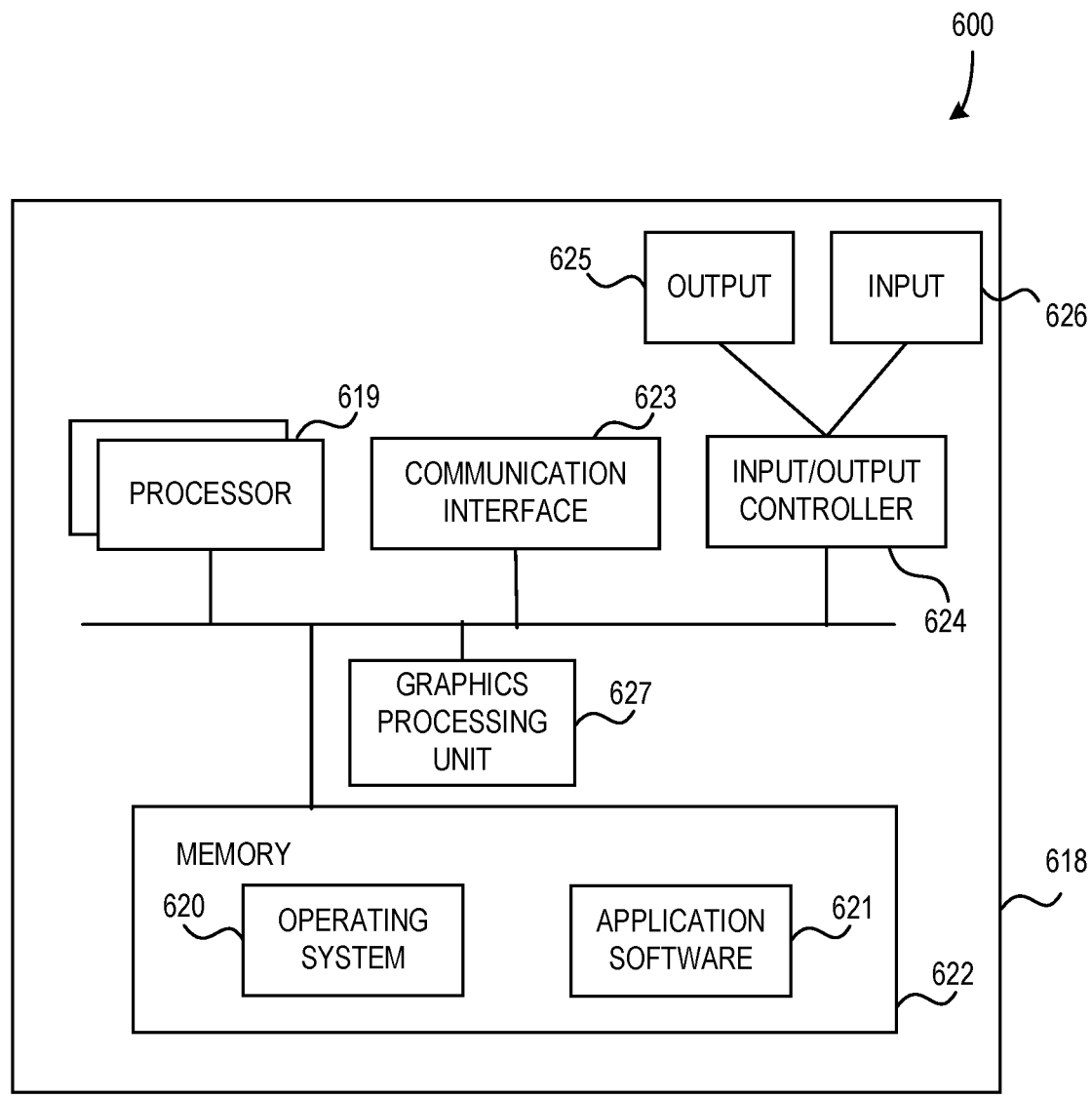
FIG. 6 illustrates a computing apparatus according to an embodiment as a functional block diagram.

The present disclosure is operable with a computing apparatus according to an embodiment as a functional block diagram 600 in FIG. 6. In an embodiment, components of a computing apparatus 618 may be implemented as a part of an electronic device according to one or more embodiments described in this specification. The computing apparatus 618 comprises one or more processors 619 which may be microprocessors, controllers, or any other suitable type of processors for processing computer executable instructions to control the operation of the electronic device. Alternatively, or in addition, the processor 619 is any technology capable of executing logic or instructions, such as a hard-coded machine. Additionally, or alternatively, in some examples, a graphics processing unit 627 (GPU) configured for executing logic or instructions is included in the computing apparatus 618. Platform software comprising an operating system 620 or any other suitable platform software may be provided on the apparatus 618 to enable application software 621 to be executed on the device. According to an embodiment, receiving and storing sensor definition data in an SDL of a sensor management device and providing the sensor definition data to end devices for use in configuring and operating connected sensors as described herein may be accomplished by software, hardware, and/or firmware.

Computer executable instructions may be provided using any computer-readable media that are accessible by the computing apparatus 618. Computer-readable media may include, for example, computer storage media such as a memory 622 and communications media. Computer storage media, such as a memory 622, include volatile and non-volatile, removable, and non-removable media implemented in any method or technology for storage of information such as computer readable instructions, data structures, program modules or the like. Computer storage media include, but are not limited to, RAM, ROM, EPROM, EEPROM, persistent memory, phase change memory, flash memory or other memory technology, CD-ROM, digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media do not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that the storage may be distributed or located remotely and accessed via a network or other communication link (e.g. using a communication interface 623).

The computing apparatus 618 may comprise an input/output controller 624 configured to output information to one or more output devices 625, for example a display or a speaker, which may be separate from or integral to the electronic device. The input/output controller 624 may also be configured to receive and process an input from one or more input devices 626, for example, a keyboard, a microphone, or a touchpad. In one embodiment, the output device 625 may also act as the input device. An example of such a device may be a touch sensitive display. The input/output controller 624 may also output data to devices other than the output device, e.g. a locally connected printing device. In some embodiments, a user may provide input to the input device(s) 626 and/or receive output from the output device(s) 625.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs) (e.g., GPU 627).

At least a portion of the functionality of the various elements in the figures may be performed by other elements in the figures, or an entity (e.g., processor, web service, server, application program, computing device, etc.) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that may be suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices may accept input from the user in any way, including from input devices such as a keyboard or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other examples of the disclosure may include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system for tracking multiple objects in a real-time video stream comprises: at least one processor; and at least one memory comprising computer program code, the at least one memory and the computer program code configured to, with the at least one processor, cause the at least one processor to: determine a frame type of an individual frame of a plurality of frames of the real-time video stream; based on the individual frame being an object detection frame type: detect a set of object proposals in the individual frame; assign associations between the set of object proposals and a set of object tracks; and update statuses of the set of object tracks based on the assigned associations; based on the individual frame being an object tracking frame type: perform single-object tracking on the individual frame based on each object track of the set of object tracks; update the set of object tracks based on the performed single-object tracking; and provide a real-time object location data stream based on the set of object tracks.

An example computerized method for tracking multiple objects in a real-time video stream comprises: determining, by a processor, a frame type of an individual frame of a plurality of frames of the real-time video stream; based on the individual frame being an object detection frame type: detecting, by the processor, a set of object proposals in the individual frame; assigning, by the processor, associations between the set of detected object proposals and a set of object tracks; updating, by the processor, statuses of the set of object tracks based on the assigned associations; based on the individual frame being an object tracking frame type: performing, by the processor, single-object tracking on the individual frame based on each object track of the set of object tracks; updating, by the processor, the set of object tracks based on the performed single-object tracking; and providing, by the processor, a real-time object location data stream based on the set of object tracks.

One or more computer storage media having computer-executable instructions for tracking multiple objects in a real-time video stream that, upon execution by a processor, cause the processor to at least: determine a frame type of an individual frame of a plurality of frames of the real-time video stream; based on the individual frame being an object detection frame type: detect a set of object proposals in the individual frame; assign associations between the set of object proposals and a set of object tracks; and update statuses of the set of object tracks based on the assigned associations; based on the individual frame being an object tracking frame type: perform single-object tracking on the individual frame based on each object track of the set of object tracks; update the set of object tracks based on the performed single-object tracking; and provide a real-time object location data stream based on the set of object tracks.

Alternatively, or in addition to the other examples described herein, examples include any combination of the following:

wherein assigning the associations between the set of detected object proposals and the set of object tracks includes: calculating affinity scores between the set of object proposals and the set of object tracks; associating a first subset of the set of detected object proposals with a set of active object tracks of the set of object tracks based on the calculated affinity scores between object proposals of the first subset and active object tracks of the set of active object tracks satisfying an active affinity requirement; and associating a second subset of the set of detected object proposals with a set of passive object tracks of the set of object tracks based on the calculated affinity scores between object proposals of the second subset and passive object tracks of the set of passive object tracks satisfying a passive affinity requirement.

wherein updating statuses of the set of object tracks based on assigned associations includes: based on a passive object track of the set of passive object tracks being associated with an object proposal of the second subset, converting the passive object track to an active object track; based on an active object track of the set of active object tracks being unassociated with an object proposal of the first subset, converting the active object track to a passive object track and set an object lifetime counter associated with the active object track to an object lifetime value; based on an object proposal of the set of object proposals being unassociated with an object track of the set of object tracks, initialize a new active object track into the set of object tracks associated with the object proposal; based on a passive object track of the set of passive object tracks being unassociated with an object proposal, decrementing an object lifetime counter associated with the passive object track; and based on a passive object track of the set of passive object tracks having an object lifetime counter equal to zero, removing the passive object track from the set of passive object tracks.

wherein converting the active object track to a passive object track includes storing a cached state of the converted passive object track; and wherein calculating affinity scores associated with passive object tracks includes calculating affinity scores based on current states of the passive object tracks, calculating affinity scores based on cached states of the passive object tracks, and selecting higher affinity scores between the affinity scores calculated based on current states of the passive object tracks and the affinity scores calculated based on cached states of the passive object tracks.

wherein the calculated affinity scores include spatial affinity scores and appearance affinity scores; wherein the active affinity requirement includes a spatial affinity threshold to be met by the spatial affinity scores; and wherein the passive affinity requirement includes an appearance affinity threshold to be met by the appearance affinity scores.

wherein determining the frame type of the individual frame of the plurality of frames of the real-time video stream includes: based on the individual frame being a first frame of a frame interval, determining that the individual frame is a detection frame; and based on the individual frame being a frame other than the first frame of the frame interval, determining that the individual frame is a tracking frame.

further comprising: training, by the processor, a single-object tracking model based on a set of multi-object training data; and wherein performing single-object tracking on the individual frame based on each object track of the set of object tracks is based on the trained single-object tracking model.

wherein the multi-object training data includes synthetic multi-person training data, wherein the single-object tracking model is trained to track multiple people in the video stream; and wherein each object proposal of the set of detected object proposals is associated with a detected person in the individual frame.

Any range or device value given herein may be extended or altered without losing the effect sought, as will be apparent to the skilled person.

While no personally identifiable information is tracked by aspects of the disclosure, examples have been described with reference to data monitored and/or collected from the users. In some examples, notice may be provided to the users of the collection of the data (e.g., via a dialog box or preference setting) and users are given the opportunity to give or deny consent for the monitoring and/or collection. The consent may take the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but with the scope of aspects of the claims constitute exemplary means for determining, by a processor, a frame type of an individual frame of a plurality of frames of the video stream; based on the individual frame being an object detection frame type: exemplary means for detecting, by the processor, a set of object proposals in the individual frame; exemplary means for assigning, by the processor, associations between the set of detected object proposals and a set of object tracks; exemplary means for updating, by the processor, statuses of the set of object tracks based on the assigned associations; based on the individual frame being an object tracking frame type: exemplary means for performing, by the processor, single-object tracking on the individual frame based on each object track of the set of object tracks; exemplary means for updating, by the processor, the set of object tracks based on the performed single-object tracking; and exemplary means for providing, by the processor, a real-time object location data stream based on the set of object tracks.

The term "comprising" is used in this specification to mean including the feature(s) or act(s) followed thereafter, without excluding the presence of one or more additional features or acts.

In some examples, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for tracking multiple objects in a real-time video stream, the system comprising:
   at least one processor;
   at least one memory comprising computer program code, the at least one memory and the computer program code configured to, with the at least one processor, cause the at least one processor to:
      determine a frame type of an individual frame of a plurality of frames of the real-time video stream as an object-detection frame type,
      detect a set of object proposals in the individual frame, the set of object proposals including a first subset and a second subset,
      associate the first subset of the set of object proposals with a set of active object tracks and the second subset of the set of object proposals with a set of passive object tracks,
      update a status of the set of object tracks based on the association of the first subset of the set of object proposals and the second subset of the set of object proposals, and process the individual frame in real-time, and
an output device configured to provide an object location data stream based on the processing.

2. The system of claim 1, wherein, to update the status of the set of object tracks, the processor is further configured to convert the set of passive object tracks to the set of active object tracks based on a passive object track of the set of passive object tracks being associated with an object proposal of the second subset.

3. The system of claim 1, wherein, to update the status of the set of object tracks, the processor is further configured to convert the set of active object tracks to the set of passive object tracks based on an active object track of the set of active object tracks being unassociated with an object proposal of the first subset.

4. The system of claim 1, wherein the processor is further configured to determine the frame type of the individual frame as the object-detection frame type based at least in part on the individual frame being a first frame of a frame interval.

5. The system of claim 4, wherein the processor is further configured to:
determine the frame type of a second individual frame in the plurality of frames as an object-tracking frame type based on the second frame being a frame other than the first frame of the frame interval.

6. The system of claim 5, wherein the processor is further configured to track the detected set of object proposals from the individual frame to the second individual frame.

7. The system of claim 1, wherein:
the provided object location data stream includes object location data that includes a state of a tracked object, and
the state of the tracked object includes a current location of the tracked object and an occlusion of the tracked object.

8. A computerized method for tracking multiple objects in a real-time video stream, the computerized method comprising:
determining a frame type of an individual frame of a plurality of frames of the real-time video stream as an object-detection frame type,
detecting a set of object proposals in the individual frame, the set of object proposals including a first subset and a second subset,
associating the first subset of the set of object proposals with a set of active object tracks and the second subset of the set of object proposals with a set of passive object tracks,
updating a status of the set of object tracks based on the association of the first subset of the set of object proposals and the second subset of the set of object proposals,
processing the individual frame in real-time, and
providing an object location data stream based on the processing.

9. The computerized method of claim 8, wherein updating the status of the set of object tracks further comprises converting the set of passive object tracks to the set of active object tracks based on a passive object track of the set of passive object tracks being associated with an object proposal of the second subset.

10. The computerized method of claim 8, wherein updating the status of the set of object tracks further comprises converting the set of active object tracks to the set of passive object tracks based on an active object track of the set of active object tracks being unassociated with an object proposal of the first subset.

11. The computerized method of claim 8, further comprising determining the frame type of the individual frame as the object-detection frame type based at least in part on the individual frame being a first frame of a frame interval.

12. The computerized method of claim 11, further comprising determining the frame type of a second individual frame in the plurality of frames as an object-tracking frame type based on the second frame being a frame other than the first frame of the frame interval.

13. The computerized method of claim 12, further comprising tracking the detected set of object proposals from the individual frame to the second individual frame.

14. The computerized method of claim 8, wherein:
the provided object location data stream includes object location data that includes a state of a tracked object, and
the state of the tracked object includes a current location of the tracked object and an occlusion of the tracked object.

15. One or more computer storage media having computer-executable instructions for tracking multiple objects in a real-time video stream that, upon execution by a processor, cause the processor to:
determine a frame type of an individual frame of a plurality of frames of the real-time video stream as an object-detection frame type;
detect a set of object proposals in the individual frame, the set of object proposals including a first subset and a second subset;
associate the first subset of the set of object proposals with a set of active object tracks and the second subset of the set of object proposals with a set of passive object tracks;
update a status of the set of object tracks based on the association of the first subset of the set of object proposals and the second subset of the set of object proposals;
process the individual frame in real-time; and
control an output device to provide an object location data stream based on the processing.

16. The one or more computer storage media of claim 15, wherein, to update the status of the set of object tracks, the instructions further cause the processor to:
convert the set of passive object tracks to the set of active object tracks based on a passive object track of the set of passive object tracks being associated with an object proposal of the second subset.

17. The one or more computer storage media of claim 15, wherein, to update the status of the set of object tracks, the instructions further cause the processor to:
convert the set of active object tracks to the set of passive object tracks based on an active object track of the set of active object tracks being unassociated with an object proposal of the first subset.

18. The one or more computer storage media of claim 15, wherein the instructions further cause the processor to:
determine the frame type of the individual frame as the object-detection frame type based at least in part on the individual frame being a first frame of a frame interval.

19. The one or more computer storage media of claim 18, wherein the instructions further cause the processor to:
determine the frame type of a second individual frame in the plurality of frames as an object-tracking frame type based on the second frame being a frame other than the first frame of the frame interval; and track the detected set of object proposals from the individual frame to the second individual frame.

20. The one or more computer storage media of claim 18, wherein:

the provided object location data stream includes object location data that includes a state of a tracked object, and the state of the tracked object includes a current location of the tracked object and an occlusion of the tracked object.

\* \* \* \* \*